(12) United States Patent
Shah

(10) Patent No.: US 6,535,729 B1
(45) Date of Patent: Mar. 18, 2003

(54) SYSTEM AND METHOD FOR PROCESSING WIRELESS FILES BASED ON FILENAME EXTENSION

(75) Inventor: Nitin J. Shah, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/082,214

(22) Filed: May 20, 1998

(51) Int. Cl.[7] .............................................. H04M 11/10

(52) U.S. Cl. .............................. 455/412; 707/1; 707/10; 707/104

(58) Field of Search .................................. 455/426, 412, 455/517, 466; 707/104, 1, 3, 10, 103

(56) References Cited

U.S. PATENT DOCUMENTS

| | | | |
|---|---|---|---|
| 5,590,320 A | * 12/1996 | Maxey | 395/619 |
| 5,601,435 A | 2/1997 | Sudman et al. | 434/307 |
| 5,675,390 A | 10/1997 | Schindler et al. | 348/552 |
| 5,852,819 A | * 12/1998 | Beller | 707/1 |
| 6,029,068 A | * 2/2000 | Takahashi et al. | 455/426 |

\* cited by examiner

*Primary Examiner*—Lee Nguyen
(74) *Attorney, Agent, or Firm*—Hitt, Gaines & Boisbrun

(57) ABSTRACT

A system for, and method of, processing a wireless file in a computer network and a communications infrastructure incorporating the system or the method. In one embodiment, the system includes: (1) an examiner that receives at least a portion of the wireless file and identifies a filename thereof and (2) a file processor that modifies a content of the wireless file based on the filename.

20 Claims, 4 Drawing Sheets

SYSTEM AND METHOD FOR PROCESSING WIRELESS FILES BASED ON FILENAME EXTENSION

TECHNICAL FIELD OF THE INVENTION

The present invention is directed, in general, to wireless communications systems and, more specifically, to a system and method for processing wireless files based on filename extension and a wireless infrastructure incorporating the system or the method.

BACKGROUND OF THE INVENTION

Wireless data and information has been steadily increasing in volume as all mobile and especially hand-held units have continued to proliferate. The future promises to continue this growth at an ever increasing rate. However, the wireless environment is generally hostile, and most of the environmental noise encountered by wireless signals is man-made with the predominant sources being other wireless user, as well as interference signals emanating from auto ignition and battery charging systems. If the mobile units are carried inside buildings, the wireless signals may be attenuated or become subject to other noise sources such as elevators and industrial machinery accentuating the problem. Even areas outside but surrounded by buildings or industrial sites create significant interference and noise for the wireless signal. A file representing wireless data or information may have significant errors, for the reasons just discussed, and therefore, require error correction and filtering to remove or "smooth" wireless transmission errors before the files may be reliably used.

Files that have been generated from wireless data or information may also be in a compressed format from the original wireless audio, video or image files. File compression removes predictable bits thereby reducing the file to its minimum reconstructible size. This also reduces the necessary transmission and storage requirements for the file. Before the files may be processed, however, they must normally be uncompressed to their original size.

Computer systems handle many types of data and information files. These files are "coded" into classes of files that normally represent the type of processing that may be performed on them. Computer based file extensions (e.g., .doc, .ppt .gif, etc.) represent certain classes of files and indeed are used to distinguish those files for particular applications. However, there are currently no standard classes specifically related to file extensions for wireless data or information.

Accordingly, what is needed in the art is a way to distinguish files that have wireless origins so that they may be easily and properly processed.

SUMMARY OF THE INVENTION

To address the above-discussed deficiencies of the prior art, the present invention provides a system for, and method of, processing a wireless file in a computer network and a communications infrastructure incorporating the system or the method. In one embodiment, the system includes: (1) an examiner that receives at least a portion of the wireless file and identifies a filename thereof and (2) a file processor that modifies a content of the wireless file based on the filename.

The present invention therefore introduces the broad concept of employing a filename (or a portion thereof) of a wireless file to determine whether or what type of processing is to be performed with respect to the wireless file. Subsequent processing can then be carried out in the computer network, in a wireless mobile station or in an ancillary communications infrastructure. "Wireless file" is defined, for purposes of the present invention, as any file that contains communications data. These data may form a datastream. The data may be audio, video or image data (user data) or may be wireless information (control data employed in communicating the user data).

In one embodiment of the present invention, the examiner identifies an extension of the filename. In an embodiment to be illustrated and described, the extension is selected from the group consisting of: .wdf ("wireless data format") and .wif ("wireless information format). Of course, other parts of the filename, or the whole filename, may be employed to determine the type or extent of wireless file modification required.

In one embodiment of the present invention, the examiner is associated with the Internet. However, those skilled in the art will readily understand that the examiner or the file processor may be associated with any other computer network, one or more wireless base stations, one or more switches or any other part of a conventional or later-developed communications infrastructure.

In one embodiment of the present invention, the file processor modifies the content by performing an action selected from the group consisting of: (1) correcting an error in the content and (2) filtering the content. Those skilled in the art are familiar with other actions that may be taken with respect to data to improve the fidelity or quality thereof or otherwise to modify the data. All such types of modification are within the broad scope of the present invention.

In one embodiment of the present invention, the content is compressed. The compression technique may be any conventional or later-developed technique. Of course, the content need not be compressed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
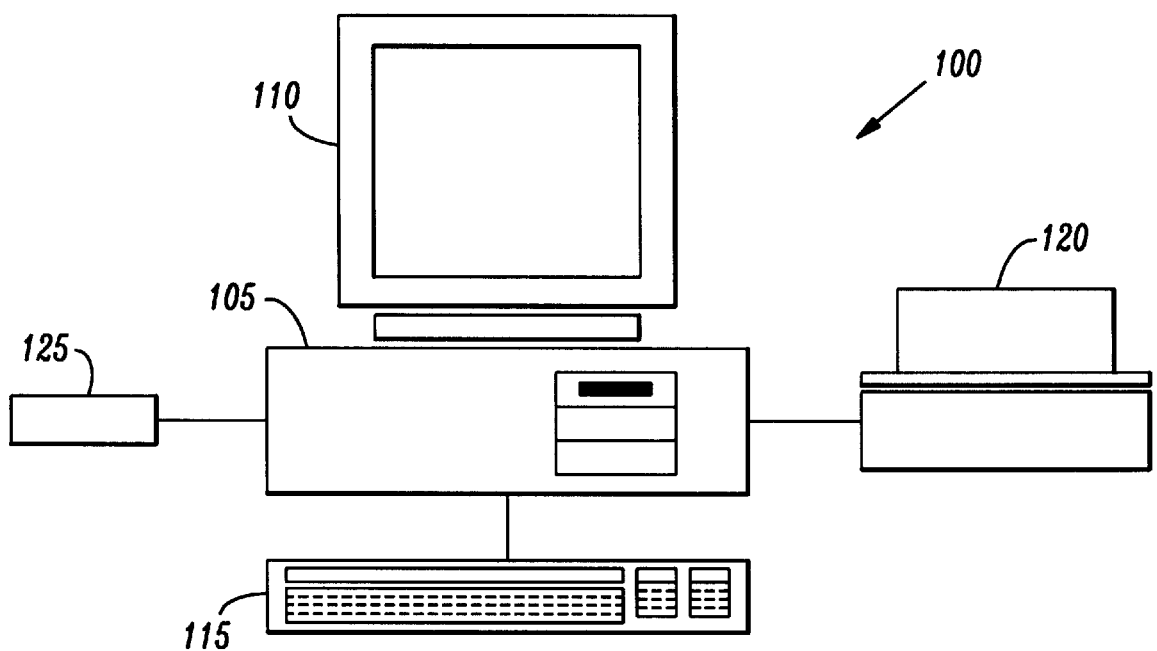
FIG. 1 illustrates a system for processing a wireless file in a computer network constructed according to the principles of the present invention.

Referring initially to FIG. 1 illustrated is a system for processing a wireless file in a computer network constructed according to the principles of the present invention. FIG. 1 shows a typical general purpose computer system 100 comprising a computer 105, a monitor 110, a keyboard 115, a printer 120 and a modem 125 for use with a telephone line or other communications network. The computer 105 contains all of the elements required to use and operate the appropriate software to process a wireless file in a computer network. The monitor 110 allows the results and interactions of the computer 105 to be displayed for interpretation by the user. The keyboard 115 allows the user to interact with the computer 105, and the printer 120 provides for generating hardcopy files related to the wireless files as appropriate. The modem 125 allows data and information to be interchanged with other sites via the computer network.

Figure 2:
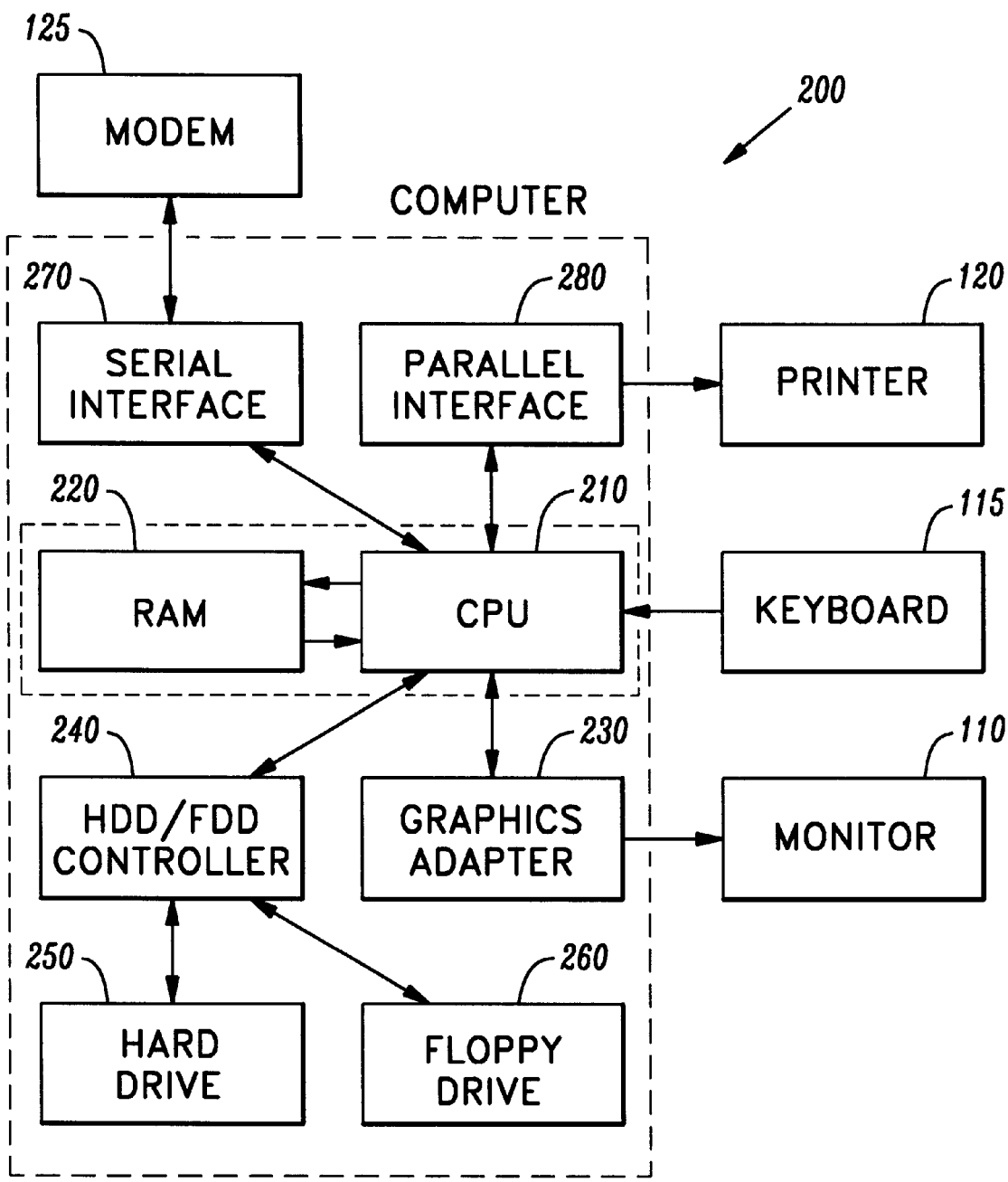
FIG. 2 illustrates a block diagram depicting the basic functional components of the computer system of FIG. 1.

Turning now to FIG. 2, illustrated is a block diagram depicting the basic functional components 200 of the computer system of FIG. 1. The computer 105 is illustrated as comprising a central processing unit ("CPU") 210, random access memory ("RAM") 220, a graphics adapter 230, a hard disk drive/floppy disk drive ("HDD/FDD") controller 240, a hard disk drive 250, a floppy disk drive 260, a serial interface 270 and a parallel interface 280. The CPU 210 is the "heart" of the computer 105 and where the processing takes place. The CPU 210 is connected directly to the keyboard (115 of FIG. 1) from which it receives data or commands. The RAM 220 is used to store or read the immediate results of the data processing or software program execution and is a fast memory element which may also contain software elements for processor instruction execution.

The graphics adaptor 230 accepts data from the CPU 210 and translates it so that it may be displayed on the monitor (110 of FIG. 1). The HDD/FDD controller 240 is used to read and write data from both the hard disk drive 250 and the floppy disk drive 260, which provide for longer term storage. The parallel interface 280 allows for parallel transfer of data, and is generally a faster way to communicate data than the serial interface 270, which may also be known as a communications interface. The parallel interface 280 typically drives the printer (120 of FIG. 1) as shown, while the serial interface 270 typically allows data interchange with other systems via the network lines through the modem (125 of FIG. 1).

The present invention may be advantageously embodied as a sequence of software instructions executable on the computer system 100 to create the apparatus and carry out the methods set forth herein. Those skilled in the art will recognize that the present invention may alternatively be embodied in hard-wired discrete or integrated circuitry or in analog circuitry. The computer system 100 or the circuitry may be associated with a computer network, a wireless mobile station or a communications infrastructure ancillary to the computer network or the wireless mobile station.

The computer system 100 supports processing a wireless file in a computer network and a communications infrastructure incorporating the system or the method. In this embodiment, the system includes an examiner that receives at least a portion of the wireless file and identifies a filename thereof, and a file processor that modifies a content of the wireless file based on the filename.

The present invention therefore introduces the broad concept of employing a filename (or a portion thereof) of a wireless file to determine whether or what type of processing is to be performed with respect to the wireless file. The communications data of the wireless file may form a datastream. The data may be audio, video or image data (user data) or may be wireless information (control data employed in communicating the user data).

The examiner identifies an extension of the filename, and the extension is selected from the group consisting of .wdf ("wireless data format") and .wif ("wireless information format"). Of course, other parts of the filename, or the whole filename, may be employed to determine the type or extent of wireless file modification required. The examiner may be associated with the Internet. However, those skilled in the art will readily understand that the examiner or the file processor may be associated with any other computer network, one or more wireless base stations, one or more switches or any other part of a conventional or later-developed communications infrastructure.

The file processor may modify the content by performing an action of correcting an error in the content and filtering the content. The content may be compressed. The compression technique may be any conventional or later-developed technique. Of course, the content need not be compressed. However, those skilled in the art are familiar with other actions that may be taken with respect to data to improve the fidelity or quality thereof or otherwise to modify the data. All such types of modification are within the broad scope of the present invention.

Figure 3:
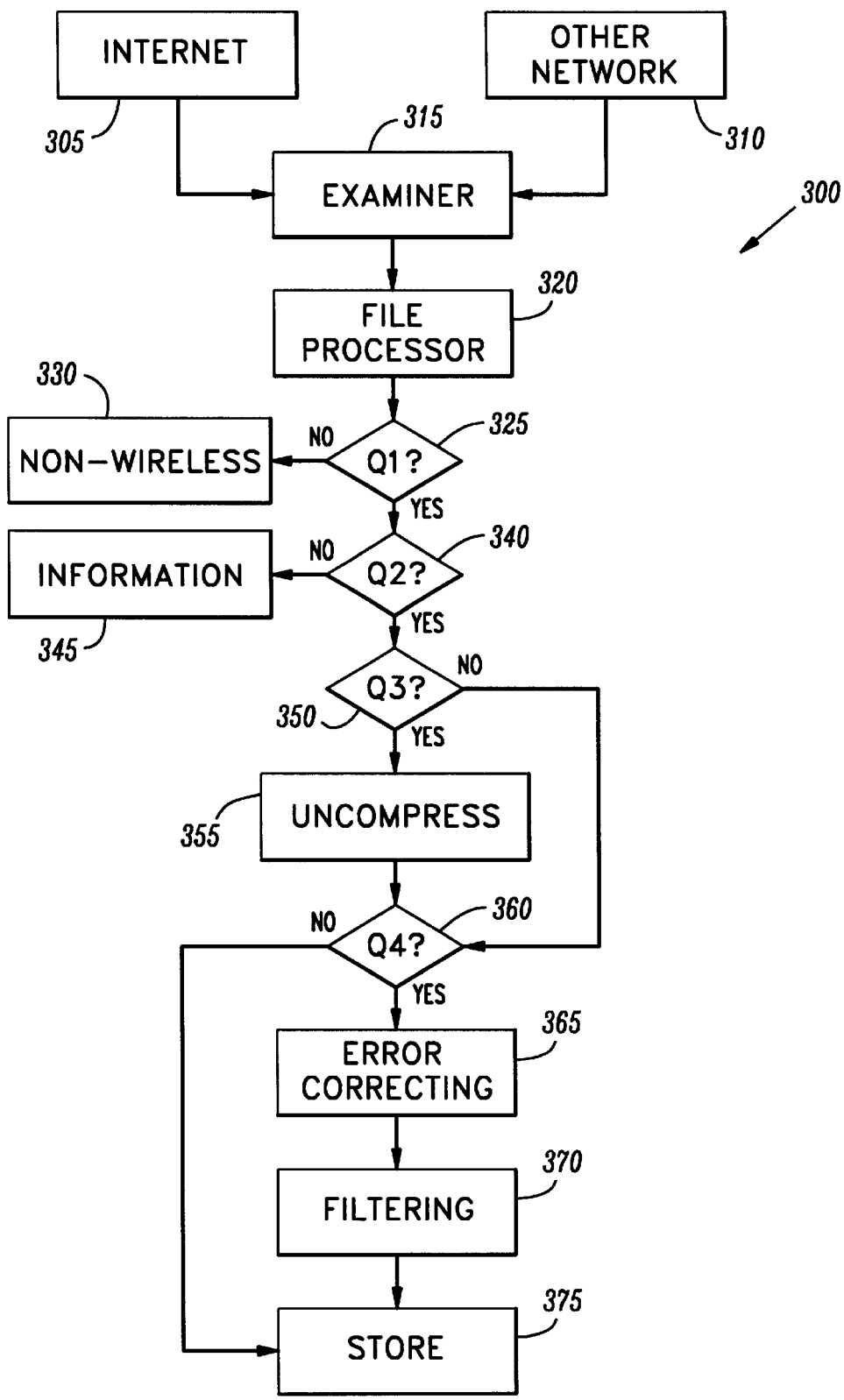
FIG. 3 illustrates a method of processing a wireless file in a computer network that may be carried out in the system of FIG. 1.

Turning now to FIG. 3, illustrated is a method of processing a wireless file in a computer network that may be carried out in the system of FIG. 1. A flow diagram 300 depicts a method of processing a wireless file in a computer network, which comprises receiving at least a portion of the wireless file, identifying a filename thereof and modifying a content of said wireless file based on the filename.

The flow diagram 300 shows that files are received by EXAMINER (a block 315) from either INTERNET (a block 305) or from OTHER. NETWORK (a block 310). INTERNET (the block 305) represents the files that reside on the Internet, and OTHER NETWORKS (the block 315) represent files that may reside on all other networks, either public or private, to which a user may gain access. EXAMINER (the block 305) typically resides in the computer system 100 that is coupled to a computer network. At least a portion of the file is received by EXAMINER (the block 315). Then the file is identified by FILE PROCESSOR (a block 320) where file identification may comprise identifying an extension of the filename or the entire filename.

Having identified the filename in FILE PROCESSOR (the block 320), a first question Q1 (a block 325) asks if the file is wireless. If the answer is NO, the file is directed to NON-WIRELESS (a block 330) where it may be further processed or stored elsewhere as the case may warrant. If the answer to the first question Q1 (the block 325) is YES, the file is directed to a second question Q2 (a block 340) which asks if the file is a datastream. If the answer is NO, the file is directed to INFORMATION (a block 345) so that the wireless information file may be processed as required. In many cases, the wireless information file will continue through the rest of the process described by the flowchart 300, as shown, but may also be directed to other processing outside of the process shown. If the answer to the second question Q2 is YES, the file is directed to a third question Q3 (a block 350).

The third question Q3 (the block 350) asks if the file is compressed. If the answer is NO, the file is directed to a fourth question Q4 (a block 360). If the answer to the third question Q3 is YES, then the compressed file is routed to UNCOMPRESS (a block 355) in order to be uncompressed before further processing. Of course, other embodiments may place the detection of the compressed file at other positions in the process.

The fourth question Q4 (the block 360) asks if the contents of the file need to be modified. If the answer is NO, the file is directed to STORE (a block 375) which stores the file for future processing. If the answer to the fourth question Q4 is YES, the file is directed to ERROR CORRECTING (a block 365) and then to a block FILTERING (a block 370), as shown. ERROR CORRECTING. (the block 365) performs error correction on the content of the wireless file, and FILTERING (the block 370) performs a filtering of the content of the file which may be as simple or complex as required. The content of the data file may be audio data, video data or image data. Of course, the contents of a wireless information file may require different forms of error correcting or filtering than a data file. Finally, the processed wireless file is stored in STORE (the block 375) for future use.

Figure 4:
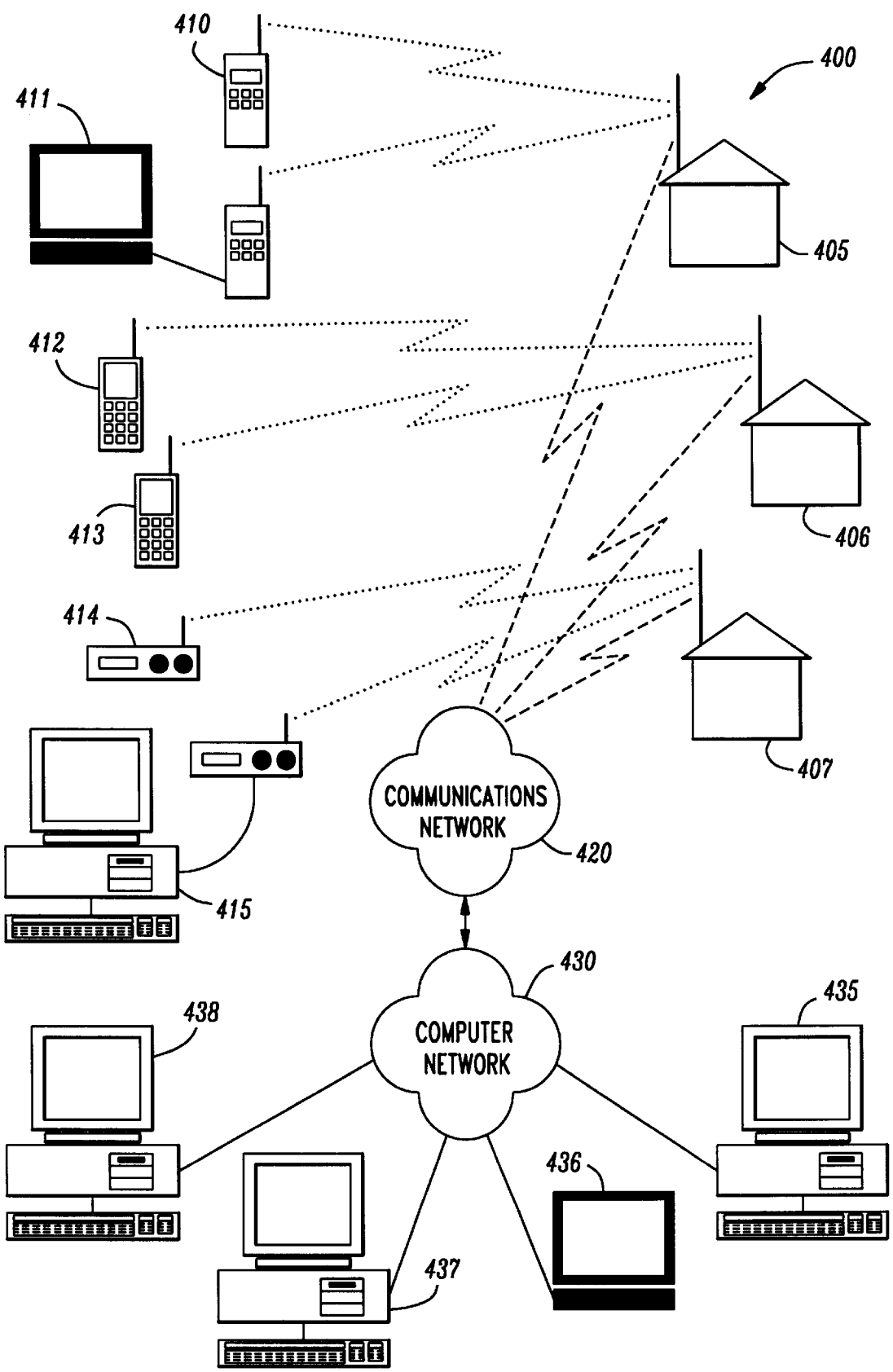
FIG. 4 illustrates a communications infrastructure that incorporates the system of FIG. 1, carries out the method of FIG. 2, or both.

Turning now to FIG. 4, illustrated is a communications infrastructure that incorporates the system of FIG. 1, carries out the method of FIG. 2, or both. FIG. 4 shows the communications infrastructure 400 comprising a plurality of wireless mobile stations 410, 411, 412, 413, 414, 415, a plurality of wireless base stations 405, 406, 407 couplable to the plurality of wireless mobile stations for communication of data using a communications network 420. Further, the communications network 420 is coupled to a computer network 430 which couples any one of the plurality of wireless base stations 405, 406, 407, and data contained in wireless files communicated among the wireless base stations 405, 406, 407 over the computer network 430, and a system for processing including a plurality of computer systems 435, 436, 437, 438 that may process wireless files. Each of the computer systems 435, 436, 437, 438 include an examiner that receives at least a portion of the wireless files and identifies filenames thereof, and a file processor that modifies the data in the wireless files based on said filenames. The examiner identifies the filename or an extension of the filename as discussed in FIG. 3. Additionally, the file processor may modify the content of the file by performing an action selected from the group-consisting of correcting an error in the content and filtering the content. The data in the wireless files may be compressed and may be audio data, video data or image data, and the files may also be other wireless information. The communications infrastructure 400 may also involve the Internet.

The wireless mobile station 410 is illustrated as being a handheld transceiver which transmits and receives audio, and the wireless mobile station 411 incorporates a handheld transceiver and a portable computer which sends and receives multimedia files. The wireless mobile station 412 is an analog cell phone, and the wireless mobile station 413 is a digital cell phone. The wireless mobile station 414 is a vehicle mounted transceiver which transmits both audio and video from a television feed, and the wireless mobile station 415 is a vehicle mounted computer system which transmits and receives audio, video and image data as well. The wireless base stations 405, 406, 407 are capable of transmitting and receiving data that are audio, video or image and the necessary control information.

From the above, it is apparent that the present invention provides a system for, and method of, processing a wireless file in a computer network and a communications infrastructure incorporating the system or the method. In one embodiment, the system includes: (1) an examiner that receives at least a portion of the wireless file and identifies a filename thereof and (2) a file processor that modifies a content of the wireless file based on the filename.

Although the present invention has been described in detail, those skilled in the art should understand that they can make various changes, substitutions and alterations herein without departing from the spirit and scope of the invention in its broadest form.

What is claimed is:

1. A system for processing a wireless file in a computer network, comprising:
    an examiner that receives at least a portion of said wireless file and identifies said wireless file as a wirelessly communicated file based on a filename employed to distinguish a wirelessly communicated file from a wireline file; and
    a file processor that modifies error in a content of said wireless file based on said filename.

2. The system as recited in claim 1 wherein said examiner identifies an extension of said filename.

3. The system as recited in claim 1 wherein said wireless file contains a wireless datastream.

4. The system as recited in claim 1 wherein said examiner is associated with the Internet.

5. The system as recited in claim 1 wherein said file processor modifies said content by performing an action selected from the group consisting of:
    correcting an error in said content, and
    filtering said content.

6. The system as recited in claim 1 wherein said content is compressed.

7. The system as recited in claim 1 wherein said content is selected from the group consisting of:
    audio data,
    video data,
    image data, and
    wireless information.

8. A method of processing a wireless file in a computer network, comprising:
    receiving at least a portion of said wireless file;
    identifying said wireless file as a wirelessly communicated file based on a filename employed to distinguish a wirelessly communicated file from a wireline file; and
    modifying error in a content of said wireless file based on said filename.

9. The method as recited in claim 8 wherein said identifying comprises identifying an extension of said filename.

10. The method as recited in claim 8 wherein said wireless file contains a wireless datastream.

11. The method as recited in claim 8 wherein said step of receiving is carried out over the Internet.

12. The method as recited in claim 8 wherein said modifying comprises modifying said content by performing an action selected from the group consisting of:
    correcting an error in said content, and
    filtering said content.

13. The method as recited in claim 8 wherein said content is compressed.

14. The method as recited in claim 8 wherein said content is selected from the group consisting of:
    audio data,
    video data,
    image data, and
    wireless information.

15. A communications infrastructure, comprising:

a plurality of wireless mobile stations;

a plurality of wireless base stations, couplable to ones of said plurality of wireless mobile stations for communication of data thereamong;

a computer network coupling ones of said plurality of wireless base stations, said data contained in wireless files communicated among said wireless base stations over said computer network; and a system for processing said wireless files, including:
- an examiner that receives at least a portion of said wireless files and identifies said wireless files as wirelessly communicated files based on filenames employed to distinguish wirelessly communicated files from wireline files, and
- a file processor that modifies error in said data in said wireless files based on said filenames.

16. The infrastructure as recited in claim 15 wherein said examiner identifies an extension of said filename.

17. The infrastructure as recited in claim 15 wherein said computer network is the Internet.

18. The infrastructure as recited in claim 15 wherein said file processor modifies said content by performing an action selected from the group consisting of:
- correcting an error in said content, and
- filtering said content.

19. The infrastructure as recited in claim 15 wherein said data in said wireless files are compressed.

20. The infrastructure as recited in claim 15 wherein said data are selected from the group consisting of:
- audio data,
- video data,
- image data, and
- wireless information.

* * * * *